(12) United States Patent
Brown

(10) Patent No.: US 11,746,485 B1
(45) Date of Patent: Sep. 5, 2023

(54) APPARATUS FOR DEPLOYING AND RETRIEVING TRAFFIC BARRICADES

(71) Applicant: Jeffrey C Brown, Walla Walla, WA (US)

(72) Inventor: Jeffrey C Brown, Walla Walla, WA (US)

( * ) Notice: Subject to any disclaimer, the term of this patent is extended or adjusted under 35 U.S.C. 154(b) by 0 days.

(21) Appl. No.: 18/169,766

(22) Filed: Feb. 15, 2023

Related U.S. Application Data

(60) Provisional application No. 63/311,210, filed on Feb. 17, 2022.

(51) Int. Cl.
*E01F 9/70* (2016.01)
*B60P 1/34* (2006.01)

(52) U.S. Cl.
CPC . *E01F 9/70* (2016.02); *B60P 1/34* (2013.01)

(58) Field of Classification Search
CPC ... E01F 13/00; E01F 13/02; B60P 1/34; B60P 1/022; B60P 1/5457; B60P 1/4457; B60P 1/4492; A61G 3/062
USPC .......................................................... 414/501
See application file for complete search history.

(56) References Cited

U.S. PATENT DOCUMENTS

| | | | | |
|---|---|---|---|---|
| 3,750,900 A * | 8/1973 | Piercey | ..................... | E01F 9/70 414/790.3 |
| 5,244,334 A * | 9/1993 | Akita | ....................... | E01F 9/70 414/501 |
| 6,056,498 A * | 5/2000 | Velinsky | ................... | E01F 9/70 414/501 |
| 2004/0057824 A1* | 3/2004 | Orthaus | ..................... | E01F 9/70 414/501 |
| 2010/0290880 A1* | 11/2010 | Brown | ..................... | B66F 9/065 193/35 R |
| 2017/0362786 A1* | 12/2017 | Betson | ..................... | E01F 9/654 |

* cited by examiner

*Primary Examiner* — Glenn F Myers

(57) ABSTRACT

A traffic barrel deploying and retrieving apparatus comprises a roller deck mounted on the tailgate of a flatbed utility truck. An aft-facing cage and a forward-facing cage are appended to the ends of the roller deck. The cages have proximal and distal walls each spaced apart by a gap into which a traffic barrel is received. The aft-facing cage stabilizes a barrel dropped into it as the barrel is left behind by the moving truck. The forward-facing cage includes swing arms and a pivotable and elevatable paddle whereby an operator uses a first swing arm to tip the barrel forward so that the paddle delves beneath it so that a second swing arm sweeps the barrel onto the paddle. The apparatus then elevates the paddle to the level of the roller deck so the retrieves barrel may be brought aboard the truck bed.

13 Claims, 6 Drawing Sheets

APPARATUS FOR DEPLOYING AND RETRIEVING TRAFFIC BARRICADES

CROSS REFERENCE TO RELATED APPLICATION

This non-provisional utility application claims the benefit of and priority to U.S. provisional patent application Ser. No. 63/311,210 "Apparatus for Deploying and Retrieving Traffic Barricades" filed 17 Feb. 2022. The entire contents of U.S. provisional patent application Ser. No. 63/311,210 "Apparatus for Deploying and Retrieving Traffic Barricades" filed 17 Feb. 2022 are hereby incorporated into this document by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The invention relates to vehicle mounted machinery for deploying and retrieving traffic barricades.

BACKGROUND

Portions of roadways which are damaged, unsafe, or under construction or maintenance are marked with barricades to warn vehicle drivers to avoid these areas. Beginning in the 1960s, saw-horse or sandwich-board style folding barricades and kerosene torches began to be replaced with reflective plastic pylons and drums in common use today.

Barricades are usually delivered to a road construction site by a utility truck and in quantity. However, removing them from the truck and placing them on the roadway presents difficulties, inefficiencies, and hazards to workers. Drums, pylons, or cones dropped by a worker aboard the truck from the truck bed onto the road sometimes tip over or roll away from their intended site and must be repositioned by another worker on foot following along behind the truck. This situation is undesirable in that it limits the speed of the truck to the walking speed of the worker in the road, and that worker is at great hazard of being struck or killed by an errant motorist attempting to navigate a dynamically changing traffic pattern.

BRIEF DESCRIPTION

A primary objective of the invention is to provide an apparatus for deploying traffic barricades delivered by a utility truck onto a road surface. Another primary objective of the invention is to provide an apparatus for retrieving a barricade from a road surface and taking it aboard a utility truck. A corollary objective of the invention is to provide an apparatus able to stabilize and orient a traffic barricade unit in an upright position. Another corollary objective of the invention is to provide such an apparatus that may be installed on a flatbed truck, pre-market or post-market, to allow barricade units to be efficiently and safely placed or removed from a work site.

Another objective of the invention is to allow for barricades to be positioned or retrieved while the utility truck is in motion. Since deploying or retrieving barricades represents a dynamic traffic control change, the truck and the workers around it or aboard it are at increased risk of a traffic collision and injury or death, another objective of the invention is to decrease the time required to deploy or retrieve barricades so that the time that these workers are exposed to elevated risk is minimized.

Another objective of the invention is to eliminate the need for any worker deploying or retrieving traffic barricades to work on foot in the vicinity of the truck, that is, to provide an apparatus to deploy and retrieve barricades while all workers remain aboard the utility truck, and none are on foot at greatest risk of being struck or killed by other vehicles. Thus another corollary objective of the invention is to allow the truck to move faster than workers can move on foot, thereby accomplishing its hazardous mission in less time.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

DETAILED DESCRIPTION OF CERTAIN EMBODIMENTS

Figure 1:
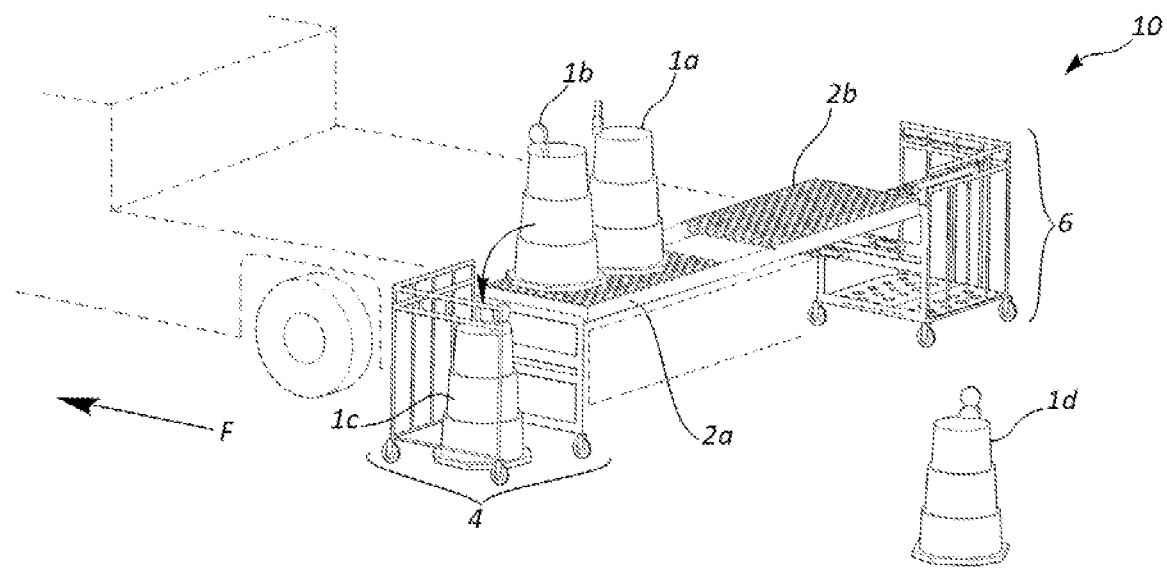
FIG. 1 shows an oblique top left rear view of an apparatus in accordance with the invention mounted on an aft portion of a utility truck for deploying and retrieving traffic barricades.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise. Also in this specification, the term "means for . . . " as used herein including the claims, is to be interpreted according to 35 USC 112 paragraph 6.

Traffic barricades may be built up of highly visible and reflective units which are often equipped with affordances to attach flashing or strobe lights for visibility at night or in poor weather. Typical reflective units include hinged sawhorse or sandwich board styles, cones, pylons, rectangular blocks, vertical posts, prisms, panels, and drums. Although the invention described herein may be used for pylons, cones, and some styles of upright prism, post, and panel barricades, it is primarily directed to manipulating drum and barrel style barricade units.

Also, although the word "barricade" may be used to mean a perimeter defined by a spaced apart series of such units, in this specification the word "barricade" and the phrase "traffic barricade unit" shall also refer to an individual unit such as a cone, a pylon, a barrel, or a drum. Drums used for traffic control include those made from or fashioned to resemble steel industrial storage drums such as the US standard 55-, 96-, and 110-gallon capacity drums which are commonly about 34½ or 42¾ inches tall and 23 to 30½ inches in diameter. Safety equipment manufacturers also produce barricade units which are open-bottomed and tapered so that they are stackable and more units may be delivered per truck load. Some barricades include weighted mats attached to their bottom perimeter to prevent tipping over. The drum dimensions listed above evince that they are bulky, ungainly objects and raising and manipulating them by human arms alone is strenuous and fatiguing work despite some all-plastic models weighing less than 15 lbm. Weighted mats may weigh about 25 lbm. Drums and barrels may also be weighted against tipping by adding circular mats cut out of recycled tire sidewalls. The bead portion of the tire sidewall fits closely around the base of the drum or barrel.

Generally, to place barrels in position at a roadway construction site or a damaged area to be avoided, a vehicle moves along the site where the drums are to be placed while one worker hands each drum down, from the vehicle, to a second worker walking alongside the truck. The second worker places the drums in position. This method is slow and requires at least two workers and a driver. A second method to place drums requires a worker to drop them from the truck onto the site. Although this method only takes one driver and one worker, it may be inefficient. For example, if the drums are not weighted, they may tip over when being dropped onto the location.

Retrieving the drums from the road is more difficult. Generally, the utility truck moves along the road from which the drum must be collected and at least one worker walks alongside the truck lifting drums onto the truck. In this scenario, the worker lifting drums may place the drums directly on the truck, or grab and lift the drum to another worker on the truck. If the drums are weighted, it may take more than one worker to lift the drums onto the truck. In either one of these scenarios, at least one worker is fighting against gravity.

The methods discussed above for placing and removing drums from a road makes for dangerous work conditions. The worker working on top of the truck may easily fall off. The worker walking alongside the truck may be hit by oncoming traffic or may be injured by a misstep.

This invention is concerned with the placement and removal of barrels at construction sites, highways, and other places where barrels may be used. The invention may be utilized on any commercially available powered and wheeled chassis of a suitable type that has the basic construction features allowing the invention to be mounted on it. In a preferred embodiment the invention may be mounted on a flatbed truck.

The invention is a traffic barricade deploying and retrieving apparatus. Referring now to the figures, FIG. 1 shows an oblique top left rear view of an apparatus in accordance with the invention mounted on an aft portion of a utility truck for deploying and retrieving traffic barricades. The apparatus [10] includes a roller deck having a first end and a second end, and extending along a transverse direction (left-right) which also defines a forward-facing and an aft-facing direction. The phantom outline of the truck evinces the forward direction toward the cab outline, and forward motion of the truck and the apparatus mounted to it is indicated by the arrow [F.] Aft and rearward directions are directly opposite to the forward direction.

A three-sided cage is mounted to each end of the roller deck. A roller deck is an assembly which comprises an array of rollers, wheels, or transfer balls which all have their zeniths coplanar. Objects may be slid within the plane with ease and at very low friction. A roller deck may include both rotatable cylindrical and rotatable spherical elements, and while arrays of wheels may be cheaper, arrays of transfer balls or ball bearings not only enable easy motions of bulky traffic barrels along the transverse direction of the roller deck, but also facilitate axial rotations of these object so that they may be deployed in preferred axial orientations. Panel style barricades may be oriented transverse to traffic flow for best visual impact, and also drums having disc-shaped warning flashers [1a, 1b, 1c, 1d] may be oriented to best effect while on the roller deck.

Of the two cages, one is a first, aft-facing cage [4,] and the other is a second, forward-facing cage [6.] Other alternative embodiments remain within the scope of the invention. For example, although it may be preferred to use a single roller deck which spans from one cage to the other, it is also possible to use two shorter left-side [2a] and right-side [2b] roller decks with a work surface or a gap between them.

Figure 2:
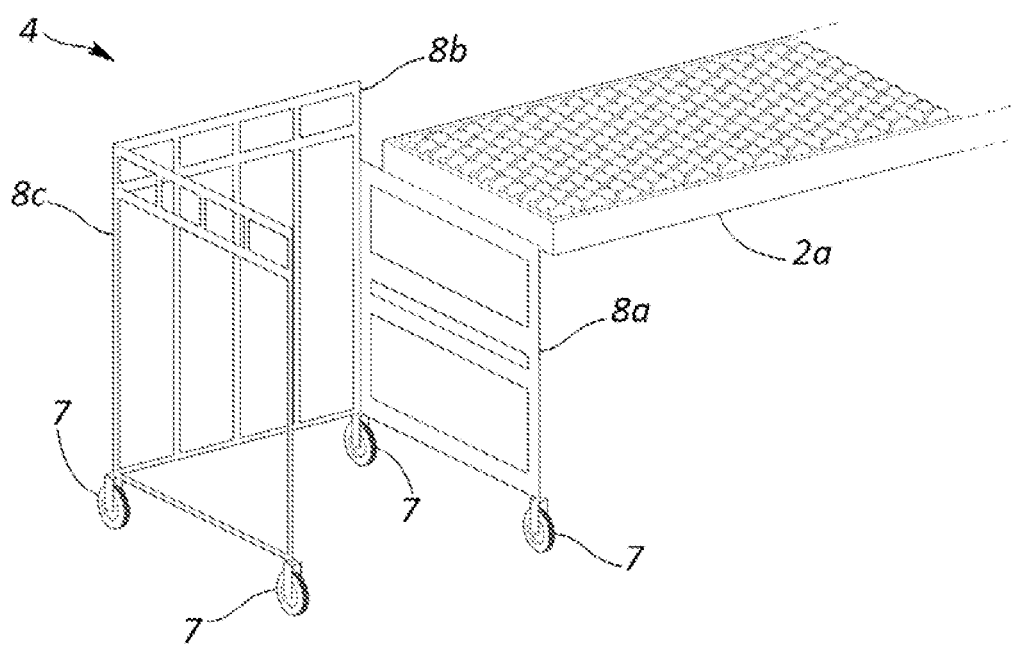
FIG. 2 shows an oblique top left rear view of the barricade deployment portion of the apparatus of FIG. 1.

FIG. 2 shows an oblique top left rear view of the barricade deployment portion of the apparatus of FIG. 1. The deployment cage is a first cage with a first proximal wall [8a] affixed to the first end of the roller deck and a first distal wall [8c] spaced apart from the proximal wall by a gap large enough to receive a barricade unit dropped into it. A first transverse wall [8b] spans between the forward edges of the proximal and distal walls so the cage walls define an aft-facing opening. Although the first transverse wall is shown as a straight-sided wall, it is also within the scope of the invention for this wall to be arcuate so that the three walls form a curved U-shape. The deployment cage is open to the roadway below, and is optionally supported by ground contact wheels [7] or casters. The wheels allow the cage to glide along on the roadway surface, and a barricade unit pushed off the end of the roller deck falls into the gap. While falling into the gap, the proximal and distal walls constrain the barricade unit and prevent it from tipping over. Once the barricade unit alights onto the roadway surface, it has been stabilized from tipping over while in the cage, and is left behind as the truck travels forward.

Figure 3:
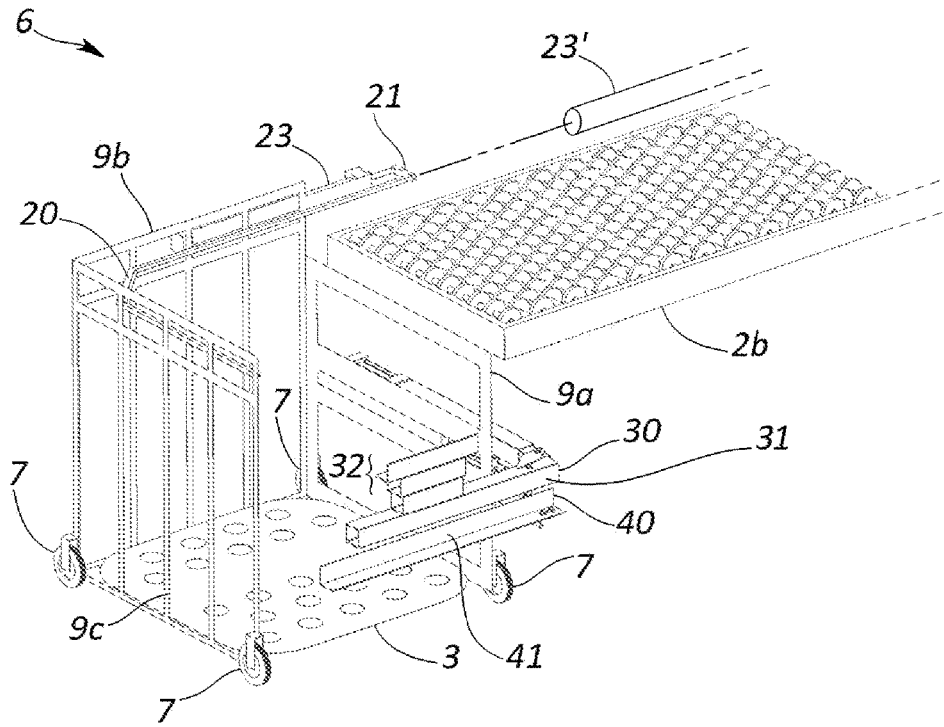
FIG. 3 shows an oblique right top front view of the barricade retrieval portion of the apparatus of FIG. 1.

FIG. 3 shows an oblique right top front view of the barricade retrieval portion of the apparatus of FIG. 1. The retrieval cage [6] is a second cage also having a second proximal wall [9a] affixed to the second end of the roller deck and a second distal wall [9c] spaced apart from the proximal wall so as to define a forward-facing opening. A second transverse wall [9b] spans between the forward edges of the proximal and distal walls. Although the transverse wall is also shown as a straight-sided wall, as with the first cage it is also within the scope of the invention for this wall to be arcuate so that the three walls form a curved U-shape. The cage is optionally supported by ground contact wheels [7] or casters.

The second cage also includes a vertically moveable and pivotable floor [3] which is also called a "paddle." The retrieval cage also has three other moving mechanical assemblies which are two swing arms and a moveable hook. The first swing arm [30] is an assembly with a slidable member which defines a substantially vertical pivot axis which is proximal to a forward edge of the second proximal wall. Nested rectangular-wall or round structural tubing may be used to define a component slidably coupled to the second cage for fore and aft excursion. In this specification "substantially vertical" shall be taken to mean any structure extending or having a longitudinal axis extending within 35 degrees of geometric vertical, which includes any vertical direction perpendicular to a horizon and any vertical direction parallel to a direction of force exerted by a local gravitational field. The first swing arm itself [31] also includes a bumper [32] partway along its length and preferably at a midpoint. The bumper in this embodiment is built up from structural channels.

The second swing arm [40] resides below the first swing arm. The second arm itself [41] in this embodiment is made from a structural angle channel. Both swing arms are pivotable by power-driven means which are linearly extensible members. For this specification, examples of linearly extensible members include but are not limited to: a pneumatic cylinder, a hydraulic cylinder, an air cylinder, a solenoid, a jack screw, and an assembly comprising a motor driven threaded member such as a threaded rod operating against a fixed nut engaged on the rod, so that rotating the threaded rod causes the nut to traverse along its length.

The third moveable mechanical assembly is a gaff hook assembly which includes a hook [20] which may be J-shaped but is preferably L-shaped. The hook is laterally slidable and moved by an extensible member such as a pneumatic or hydraulic cylinder [23] which may be affixed to the cage as shown or may alternately be affixed to the utility truck or the roller deck as shown in location [23'.] The hook is connected to the extensible member by an offset link [21.] The only difference made by this option is whether or not a motion of the hook to sweep a barrel, pylon, or drum from the paddle in its elevated position (see FIG. 5d) requires a pushing or a pulling motion.

Another way to define the traffic barricade retrieval cage is to recite that within the scope of the entire apparatus it is a second cage defined by a proximal wall, a transverse wall, and a distal wall spaced apart from the proximal wall, so that these three walls define a forward-facing opening. The traffic barricade retrieval cage also includes a vertically moveable and pivotable floor, and a swing arm with a substantially vertical pivot axis proximal to a forward edge of the proximal wall.

Figure 4A:
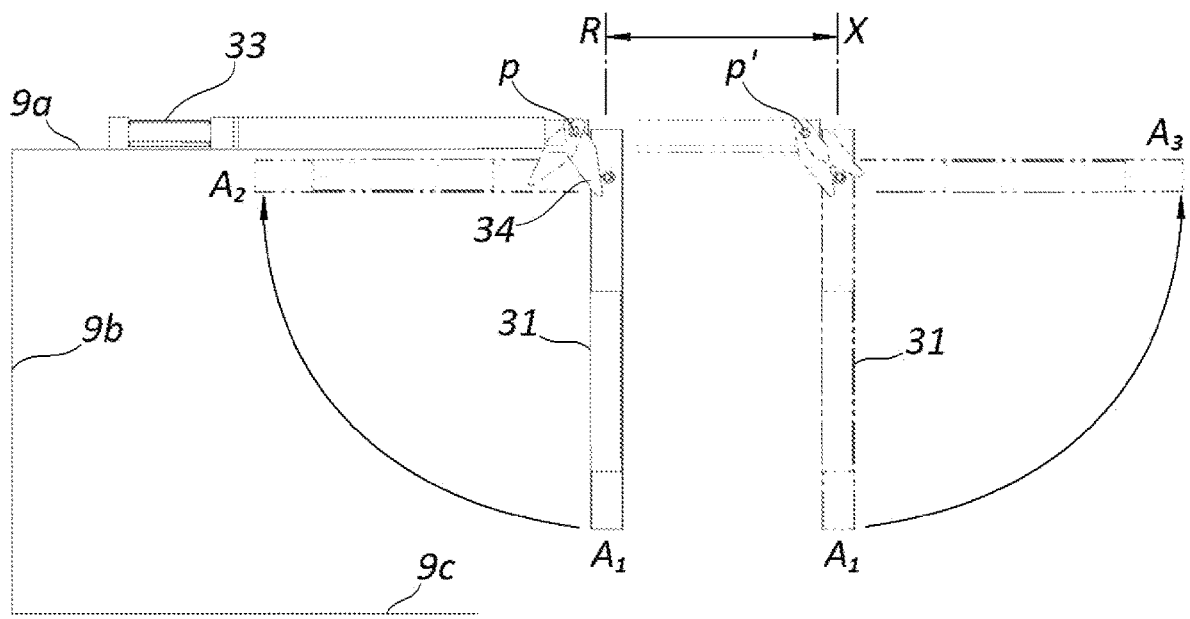
FIG. 4a shows a top view of an embodiment of an upper arm assembly of the retrieval portion of the apparatus of FIG. 1, and the motions and excursions available for these components.

FIG. 4a shows a top view of an embodiment of an upper arm assembly of the retrieval portion of the apparatus of FIG. 1, and the motions and excursions available for these components. The upper arm assembly is the first swing arm assembly. This swing arm [31] is swingable between a forward-pointing position [$A_3$] and an aft-pointing position [$A_2$,] and also swingable to an intermediate transverse position [$A_1$.] The first swing arm assembly also includes a slidable member which defines a substantially vertical pivot axis [p] which is proximal to a forward edge of the second proximal wall [9a.] The rest of the cage is defined by distal wall [9c] and transverse wall [9b.] The slidable member is driven by a linearly extensible member [33] such as a pneumatic cylinder, so that when extended the pivot axis of the swing arm moves to an extended location [p'.] A second linearly extensible member is used to pivot the swing arm by means of a bellcrank [34] or a similar link.

Figure 4B:
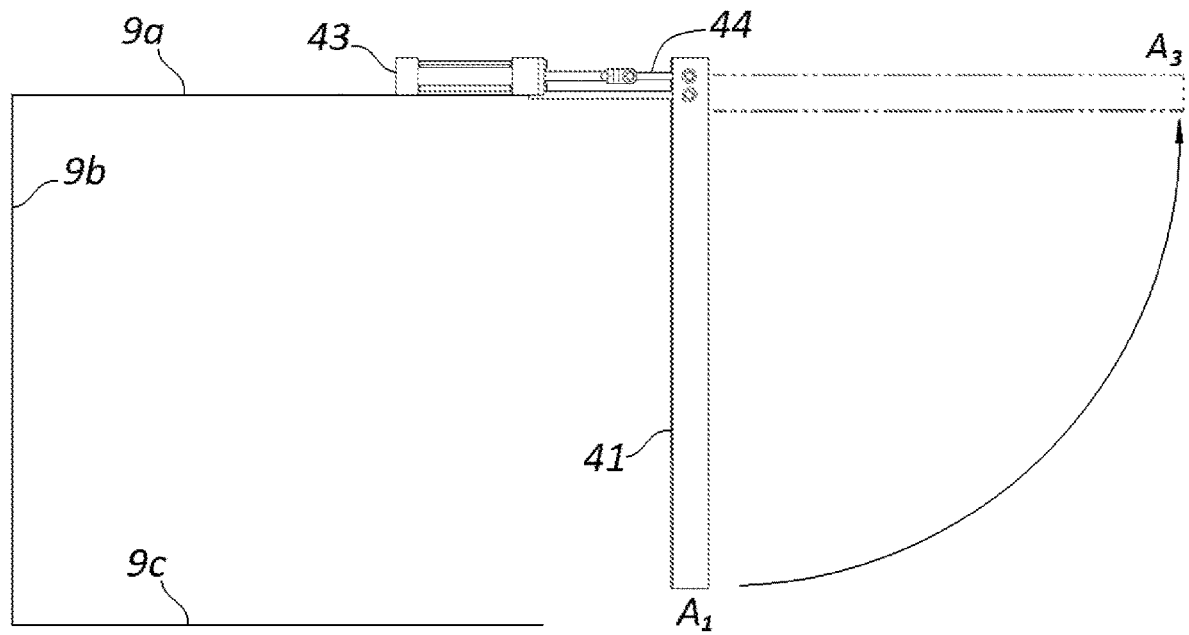
FIG. 4b shows a top view of an embodiment of a lower arm assembly of the retrieval portion of the apparatus of FIG. 1, and the motions available for these components.

FIG. 4b shows a top view of an embodiment of a lower arm assembly of the retrieval portion of the apparatus of FIG. 1, and the motions available for these components. The lower arm assembly is the second swing arm assembly. This swing arm [41] is swingable between a forward-pointing position [$A_3$] and a transverse position [$A_1$] powered a linearly extensible member [43] such as a pneumatic cylinder connected to the swing arm by connecting rod [44] or a similar link. The pivot axis for this swing arm is also proximal to the forward edge of the second proximal wall [9a.] As in FIG. 4a, the rest of the cage is defined by distal wall [9c] and transverse wall [9b.]

Figure 4C:
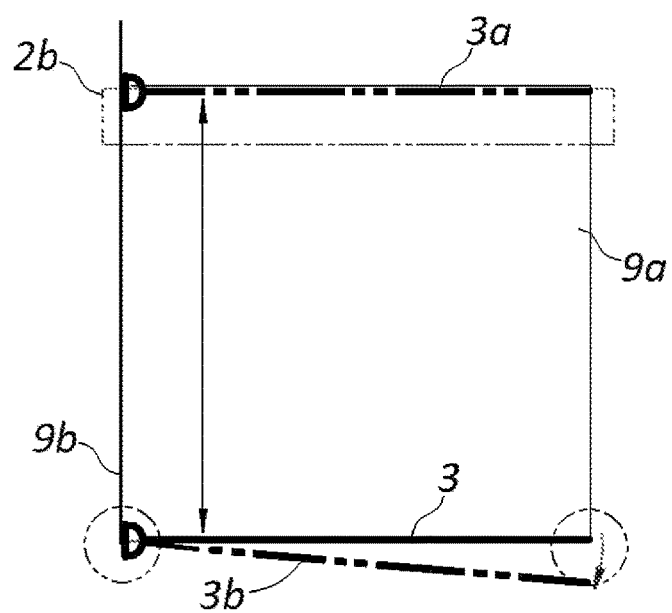
FIG. 4c shows a right side view of stylized components of an embodiment of a moveable floor or "paddle" assembly of the retrieval portion of the apparatus of FIG. 1, and the motions and excursions available for these components.

FIG. 4c shows a right side view of stylized components of an embodiment of a moveable floor [3] or "paddle" assembly of the retrieval portion of the apparatus of FIG. 1, and the motions and excursions available for these components. The proximal wall [9a] and transverse wall [9b] of the second cage are shown with the distal wall omitted to view the paddle. The paddle may rest at a low, horizontal position, and it may also be pivoted about a hinge axis close to the transverse wall of the cage, to a dipped position [3b] where its forward edge touches or is close to the road surface. The paddle also elevates to a raised position [3a] level or nearly level with the rolling plane of the roller deck [2b.] The motions of the paddle may be driven by air cylinder, stepper motors, hydraulics, jack screws, or lead screws, or other mechanical means.

Figure 4D:
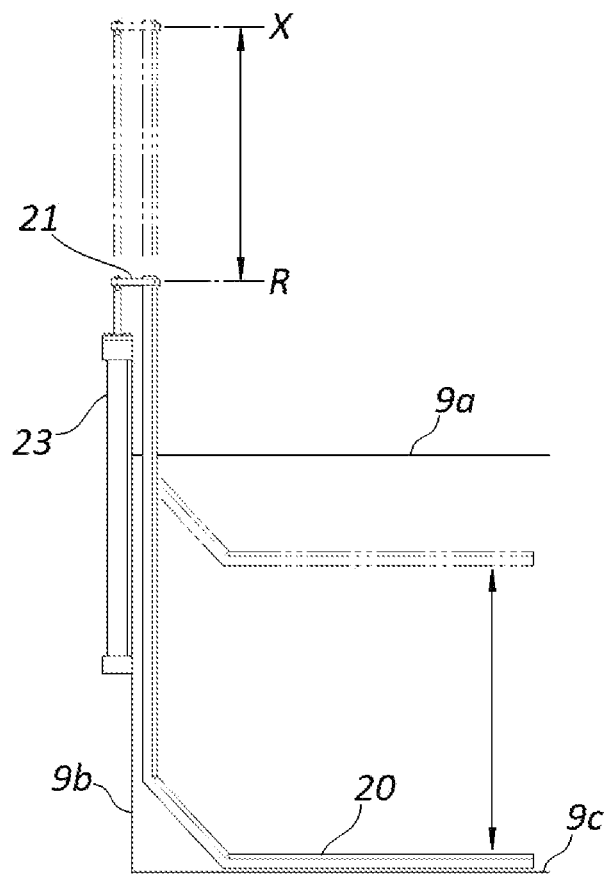
FIG. 4d shows a top view of an embodiment of a gaff hook assembly of the retrieval portion of the apparatus of FIG. 1, and the motions and excursions available for these components.

FIG. 4d shows a top view of an embodiment of a gaff hook assembly of the retrieval portion of the apparatus of FIG. 1, and the motions and excursions available for these components. The gaff hook assembly is affixed to the second cage or retrieval cage of the apparatus. The second cage is defined by a proximal wall [9a,] a distal wall [9c,] and transverse wall [9b.] The gaff hook [20] moves in a transverse direction with respect to the forward and transverse directions defined by the roller deck and the utility truck.

When the paddle is raised with a retrieved traffic barrel on it, the gaff hook may be used to sweep the traffic barrel off the paddle and onto the roller deck. The gaff hook is powered by an actuator [23] which may be a pneumatic or hydraulic cylinder, or other linearly extensible means which extends between a retracted position [R] and an extended position [X] and connects to the gaff hook by an offset link [21] or similar connector.

Figure 5A:
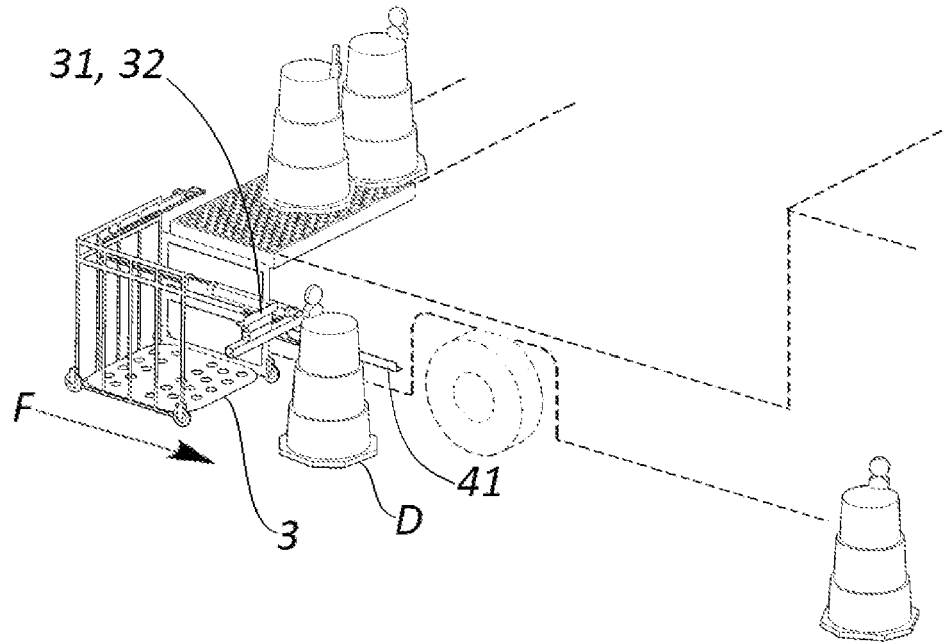
FIGS. 5a through 5e show an oblique top right front view of the retrieval portion of the apparatus of FIG. 1 in operation and a sequence of steps for retrieving a barricade drum from a roadway surface to take the drum aboard the utility truck.

FIGS. 5a through 5e show an oblique top right front view of the retrieval portion of the apparatus of FIG. 1 in operation and a sequence of steps for retrieving a barricade drum from a roadway surface to take the drum aboard the utility truck. In FIG. 5a the truck is shown in motion along a forward direction [F] approaching a traffic barrel [D] to be retrieved and the driver would be aligning the truck and retrieval cage so that the paddle [3] will scoop up the traffic barrel. At this step the lower arm [41] is extended forward and the upper arm [31] and bumper [32] are positioned transverse with respect to the motion of the truck.

Figure 5B:
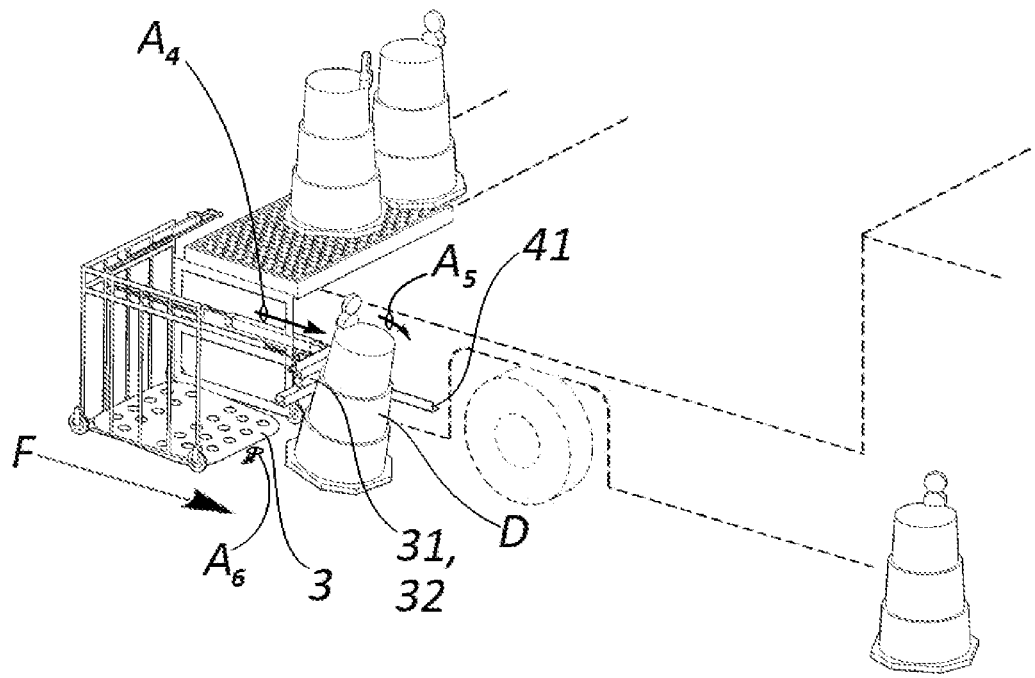

In FIG. 5b, the upper arm is extended by its slideable member along motion arrow [A$_4$] so that as the truck continues in motion along forward direction [F] the bumper [32] of the upper arm [31] impacts the traffic barrel [D] and causes it to begin to tip forward so that the rear portion of its base is now elevated above the road surface. The tipping motion is illustrated by motion arrow [A$_4$.] According to some embodiments within the scope of the invention, the bumper includes a compliant component which absorbs a portion of the collision impact, such as a forward-facing cushioned pad, a compressible spring, a cantilever member, or with the arm itself acting as a torsional spring. The forward edge of the paddle is dipped by its pivoting motion at its rear edge as illustrated by motion arrow [A$_6$.]

Figure 5C:
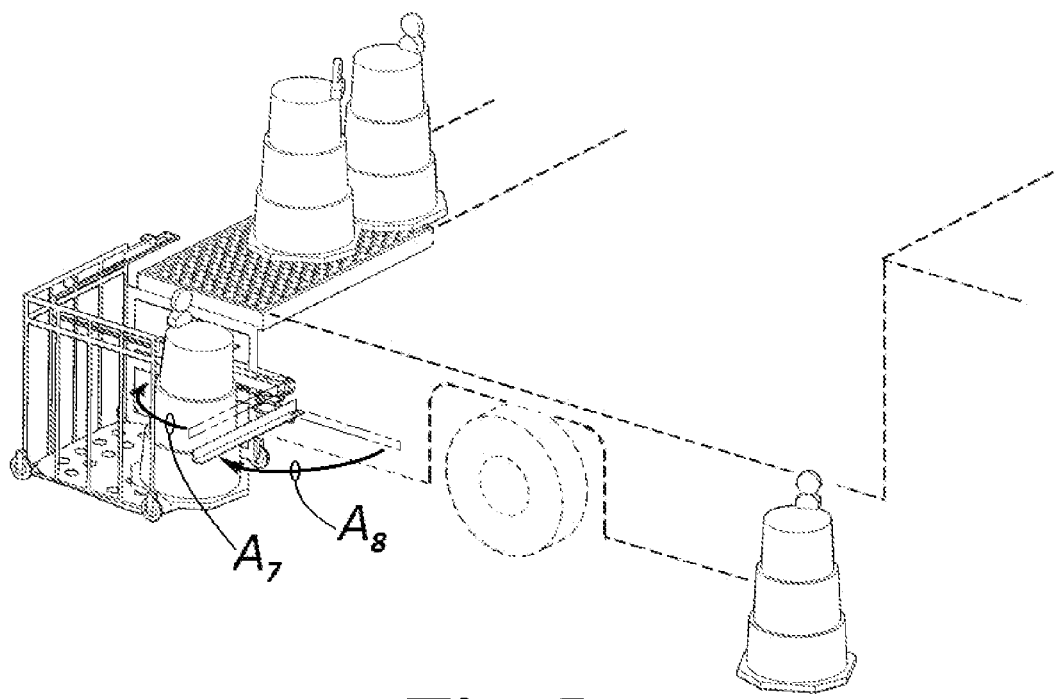

In FIG. 5c, with the front edge of the paddle able to "sneak" in underneath the elevated rear portion of the tipped traffic barrel, the upper arm swings to a rearward-pointing orientation [A$_2$.] of FIG. 4a. This swinging motion is illustrated here by motion arrow [A$_7$.] The slidable member of the upper arm assembly may also be retracted at this step or at a later step. The traffic barrel may then be swept entirely aboard the paddle and into the cage by the swing motion of the lower arm illustrated by motion arrow [A$_8$.]

Figure 5D:
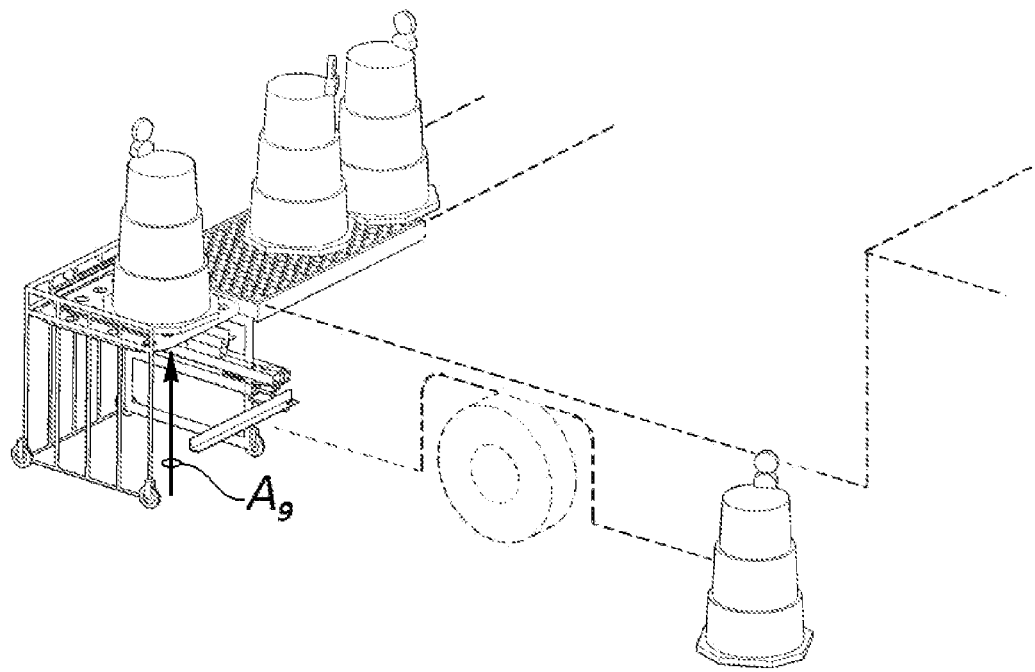

In FIG. 5d, the paddle is restored to a horizontal position and then raises the caged traffic barrel up to the level of the roller deck in a vertical motion illustrated here by motion arrow [A$_9$.]

Figure 5E:
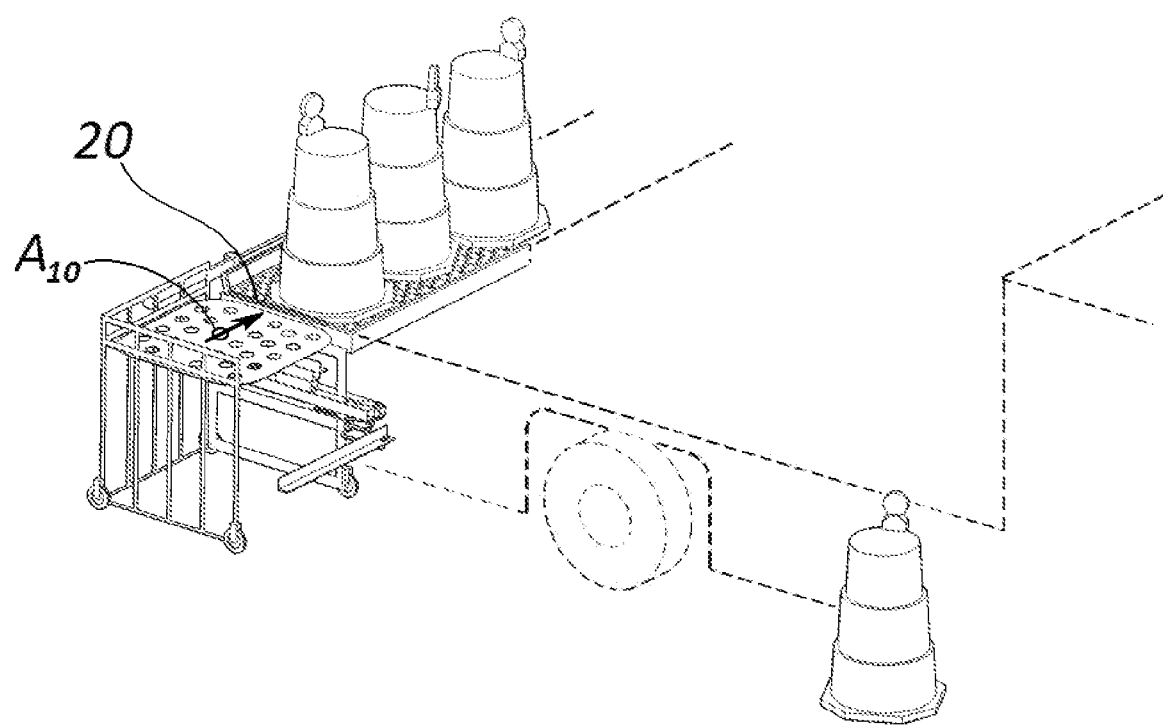

Lastly in FIG. 5e, the traffic barrel is brought aboard the truck by the sweep motion of the gaff hook [20] illustrated by motion arrow [A$_{10}$.] The gaff hook actuator is preferably powerful enough so that if the traffic barrel moved by the hook bumps into other barrels on the roller deck, then the actuator may move all them in a row to clear the paddle for the next barrel to be retrieved. Also, although the forward motion arrow is not shown in FIGS. 5c through 5e, it is possible to execute the steps shown therein while the truck is in motion or stationary.

Other alternative embodiments remain within the scope of the invention. For example, although the aft-facing deployment cage is shown on the left side of the truck and roller deck and the forward-facing retrieval cage is shown on the opposite end of the roller deck on the right side of the truck, it is possible to build a symmetrically reversed apparatus within the scope of the invention, having the forward facing aft-facing deployment cage is shown on the right side of the truck and roller deck and the forward-facing retrieval cage on the opposite end of the roller deck on the left side of the truck. It is also possible albeit probably less practical to use the invention with the retrieval cage having an aft-facing opening and the deployment cage facing forward. In this configuration the truck would be driven in reverse while deploying and retrieving traffic barrels. It may be more practical to do this if a worker in the bed of the truck is somehow better able to see and align the retrieval cage as the truck approaches a traffic barrel to be collected, and somehow communicates steering commands to the driver.

While certain features and aspects have been described with respect to exemplary embodiments, one skilled in the art will recognize that numerous modifications are possible. Also, while certain functionality is ascribed to certain system components, unless the context dictates otherwise, this functionality may be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems.

The present disclosure is not to be limited in terms of the particular embodiments described in this application, which are intended as illustrations of various aspects. Many modifications and variations may be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise. Thus, unauthorized instances of apparatuses and methods claimed herein are to be considered infringing, no matter where in the world they are advertised, sold, offered for sale, used, possessed, or performed.

Consequently and in summary, although many exemplary embodiments are described above, it will be appreciated that the invention is intended to cover all modifications and equivalents within the scope of the following claims.

What is claimed is:

1. A traffic barricade deploying and retrieving apparatus, comprising:
   a roller deck having a first end and a second end extending along a transverse
   direction and defining a forward-facing and an aft-facing direction,
   a first, aft-facing cage, and
   a second, forward-facing cage,
   with said first cage defining
      a first proximal wall affixed to said first end of said roller deck,
      a first distal wall spaced apart from said proximal wall, a transverse wall, and an aft-facing opening, with said second cage defining
a second proximal wall affixed to said second end of said roller deck,
a second distal wall spaced apart from said proximal wall,
a transverse wall, and
a forward-facing opening,
and with said second cage further comprising
a vertically moveable and pivotable floor,
a swing arm with a substantially vertical pivot axis proximal to a forward edge of said second proximal wall, and
with said pivot axis defined by a component slidably coupled to said second cage for fore and aft excursion.

2. The traffic barricade deploying and retrieving apparatus of claim 1, wherein said first cage further comprises at least one ground contact wheel.

3. The traffic barricade deploying and retrieving apparatus of claim 1, wherein said second cage further comprises at least one ground contact wheel.

4. The traffic barricade deploying and retrieving apparatus of claim 1, wherein said swing arm further comprises a bumper.

5. The traffic barricade deploying and retrieving apparatus of claim 1, wherein said swing arm is a first swing arm swingable between a forward-pointing position and an aft-pointing position, and swingable to a transverse position, and further comprising a second swing arm swingable between a forward-pointing position and a transverse position.

6. The traffic barricade deploying and retrieving apparatus of claim 1, wherein said swing arm is operably coupled to a linearly extensible member.

7. The traffic barricade deploying and retrieving apparatus of claim 1, wherein said second cage further comprises a laterally slidable gaff hook.

8. A traffic barricade retrieval cage, defining
a proximal wall,
a transverse wall, and
a distal wall spaced apart from said proximal wall, and defining a forward-facing opening,
a vertically moveable and pivotable floor, and
a swing arm with a substantially vertical pivot axis proximal to a forward edge of said proximal wall,
wherein said pivot axis is defined by a component slidably coupled to said second cage for fore and aft excursion.

9. The traffic barricade retrieval cage of claim 8, wherein said swing arm is a first swing arm swingable between a forward-pointing position and an aft-pointing position, and swingable to a transverse position, and further comprising second swing arm swingable between a forward-pointing position and a transverse position.

10. The traffic barricade retrieval cage of claim 8, wherein said swing arm further comprises a bumper.

11. The traffic barricade retrieval cage of claim 8, further comprising at least one ground contact wheel.

12. The traffic barricade retrieval cage of claim 11, wherein said ground contact wheel is a component of a caster.

13. The traffic barricade retrieval cage of claim 8, wherein said traffic barricade retrieval cage further comprises a laterally slidable gaff hook.

* * * * *